United States Patent [19]

Schwalenberg et al.

[11] 4,345,421
[45] Aug. 24, 1982

[54] BALING MACHINE WITH A NON-CIRCULAR CHAMBER

[75] Inventors: Terry R. Schwalenberg, Medford; Frank C. Krumholz, Owatonna; Glenn G. Kanengieter, Blooming Prairie; Larry L. Henkensiefken, Waseca, all of Minn.

[73] Assignee: Owatonna Manufacturing Company, Inc., Owatonna, Minn.

[21] Appl. No.: 214,195

[22] Filed: Dec. 8, 1980

[51] Int. Cl.³ .................... A01D 39/00; B30B 5/04
[52] U.S. Cl. .................................... 56/341; 100/88
[58] Field of Search .................... 56/341, 342, 343; 100/88, 89

[56] References Cited

U.S. PATENT DOCUMENTS

| 2,458,619 | 3/1981 | Gaeddert | 56/341 |
| 4,119,026 | 10/1978 | Sacht | 56/341 |
| 4,135,352 | 1/1979 | Swenson et al. | 100/88 |
| 4,198,804 | 4/1980 | Konekamp et al. | 56/341 |
| 4,212,149 | 7/1980 | Krone et al. | 56/341 |

FOREIGN PATENT DOCUMENTS 2656897 6/1978 Fed. Rep. of Germany ........ 56/341

*Primary Examiner*—Robert A. Hafer
*Attorney, Agent, or Firm*—Merchant, Gould, Smith, Edell, Welter & Schmidt

[57] ABSTRACT

A machine (10) for forming material into cylindrical bales of density increasing from the center to the periphery, comprising a mobile structure (11) including first (14) and second (15) body portions pivotably secured together on a generally horizontal transverse axis, a baling chamber (20), in the structure, defined by portions of the peripheries of a plurality of closely spaced conveyors in the form right circular cylinders (21-39) mounted with their axes parallel and passing through points lying on a smooth closed curve in a vertical plane perpendicular to the axis, the lower half of the curve being generally a circular arc and the upper half departing outwardly from circularity by an amount which varies smoothly to and from a maximum in the vertical direction: a pickup mechanism (80-83) is provided for gathering material to be baled from the ground and introducing it as a ribbon peripherally into the chamber at its bottom, and a drive arrangement (17, 60-67, 70-73, 84, 85) is provided for causing operation of the pickup mechanism and the conveyors.

11 Claims, 5 Drawing Figures

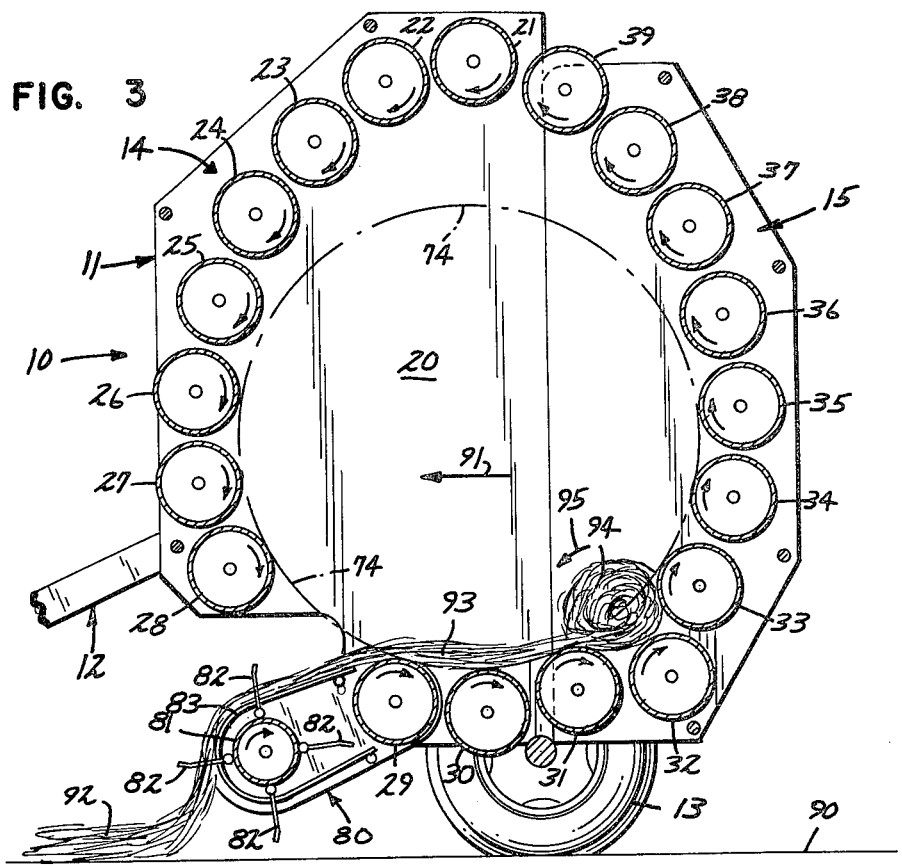
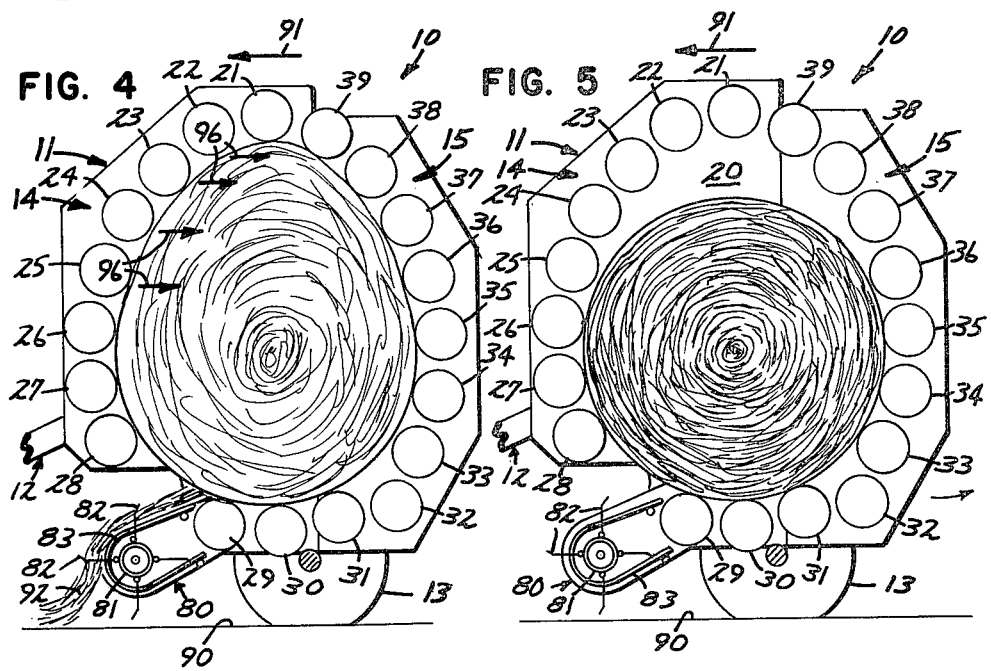

BALING MACHINE WITH A NON-CIRCULAR CHAMBER

Technical Field

The present invention relates broadly to the field of agricultural machinery. More particularly, the present invention relates to a bale forming machine which picks up vegetative material from the ground and forms the material into cylindrical bales of increasing density from the center outward.

BACKGROUND OF THE INVENTION

Baling machines which roll fibrous agricultural material into cylindrical bales have been in use for a number of years. One type of roll baler uses a plurality of circulating conveyor belts extending over the whole axial width of the machine, and arranged and driven to define the periphery of a baling chamber into which material is fed from a forward opening in the bottom and in which it is rotated and compressed by the conveyor elements. In another type of baling machine the conveyor elements take the form of cylinders arranged to jointly define by portions of their peripheries a baling chamber for rotating and compressing the material. Machines embodying both of these principals are taught in Sacht U.S. Pat. No. 4,119,026. These machines produce bales which are of light density at the center and increasing outwardly: such bales have a tendency to settle or "squat", thus losing their round outline. The conveyor rollers, being located essentially on a circle about the horizontal axis of the machine, act radially on the material rotating within them to produce a bale having an average density of about ten pounds per cubic foot.

SUMMARY OF THE INVENTION

The present invention modifies that just described by changing the positions of the conveyor rollers in two important particulars. In the first place, the lower rollers, with one exception, are located on a circle around the horizontal axis of the machine, but the upper rollers are positioned at increasingly large outward displacements from that circle, to a maximum in the vertically upward direction, to define a baling chamber which is taller than it is wide. A body of material which just fills the chamber cannot rotate therein without the occurrence of some peripheral movement of material at the top of the chamber with respect to the remainder of the material, and this relative movement or "kneading" of the bale during its compression increases the density of the bale peripherally without materially changing the directly radial forces acting on the material. The result is a bale which is not only denser outwardly than at its center, but is also of a greater average density of 11 to 12 pounds per cubic foot.

A second distinction of the present invention over the prior structure is the relocation of one of the bottom rollers, that one horizontally opposite to the inlet aperture of the machine, so that it too is outwardly displaced from the location of its neighboring rollers on the circle referred to above. By this arrangement the infeed material is abruptly turned back on itself, initiating the formation of a bale of material with a smaller girth and less central void to be overcome in compressing the material subsequently. By these two distinguishing features a machine is produced which has the desirable infeed and bale discharging features and which yet produces bales having the desired improved characteristics.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals indicate corresponding parts throughout the several views.

FIG. 3 is a central longitudinal vertical section of the baling machine; and

FIGS. 4 and 5 are diagrammatic views similar to FIG. 3, to a smaller scale, showing successive stages in the baling operation.

DETAILED DESCRIPTION OF THE INVENTION

Figure 1:
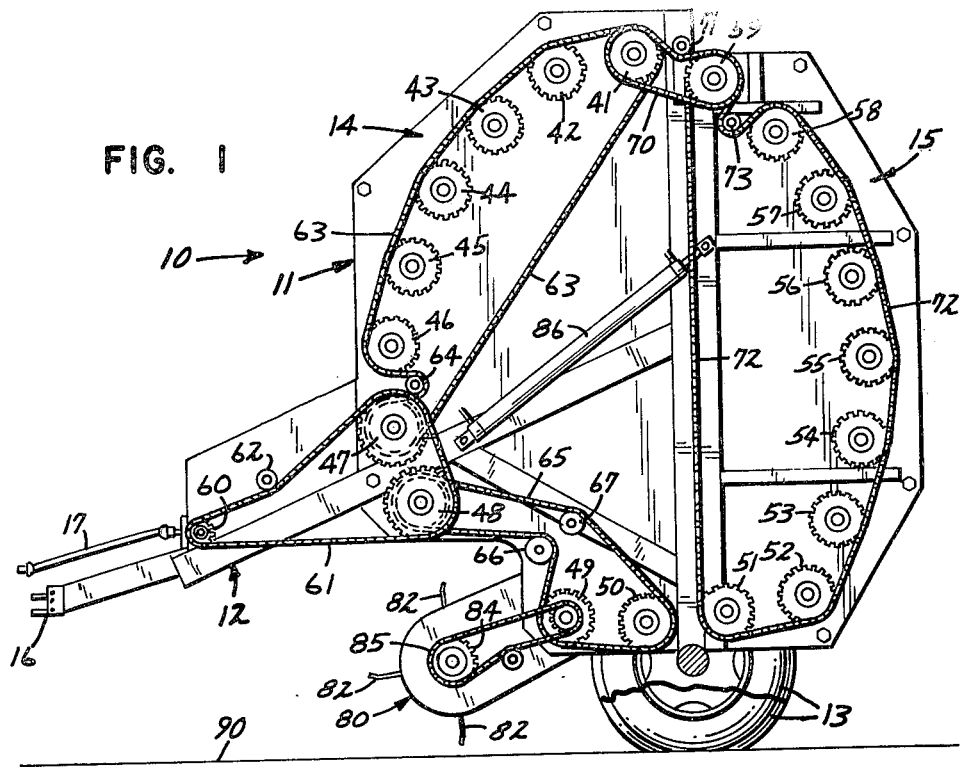
FIG. 1 is a side view of a baling machine incorporating the invention, seen from the left.
Figure 2:
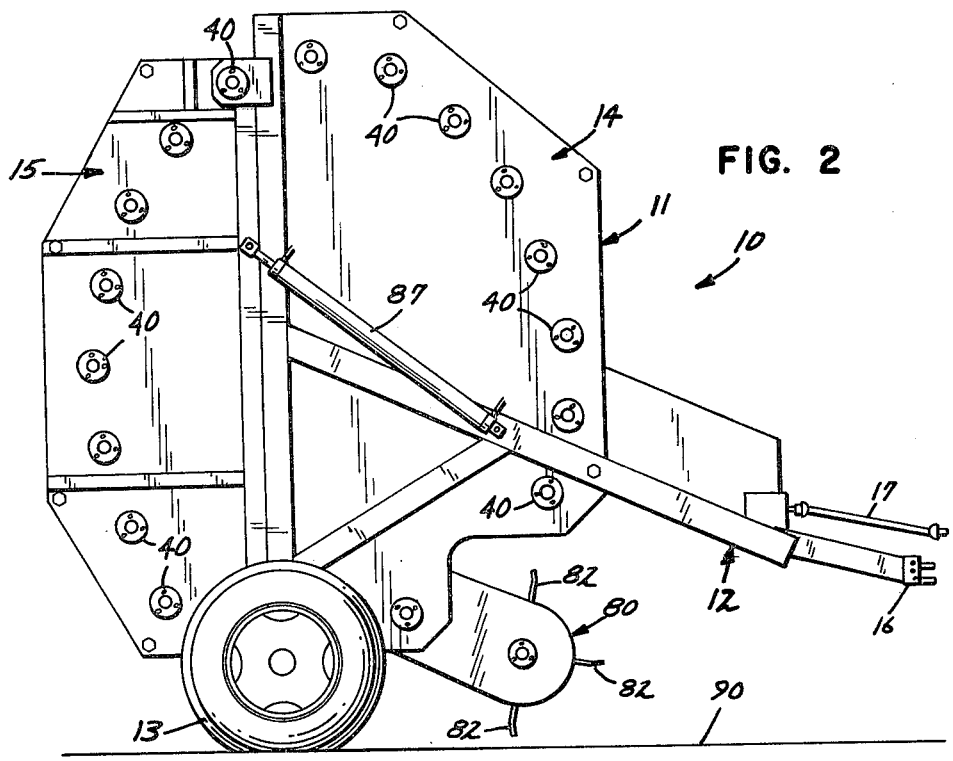
FIG. 2 is a similar view seen from the right.

Referring now to the drawings in detail, there is shown a baling machine 10 which includes a baling structure 11 carried by a support framework 12 including transport wheels 13. Structure 11 comprises a front body portion 14, affixed to framework 12, and a rear body portion 15 pivoted with respect to portion 14 about an upper transverse horizontal axis.

Machine 10 is designed to be drawn over the ground by a farm vehicle such as a tractor. An adjustable hitch 16 is connected to framework 12 for coupling the machine to the tractor. A drive shaft 17 is supported above the hitch for supplying power to the baling machine from the power takeoff of the tractor.

A baling chamber 20 is defined within structure 11 by portions of the peripheries of a plurality of conveyors in the form of closely spaced rollers or right circular cylinders mounted for rotation about parallel transverse axes. Thus the front body portion 14 carries upper rollers 21, 22, 23, 24, 25, 26, 27 and 28 and lower rollers 29 and 30, and the rear body portion 15 carries lower rollers 31 and 32 and upper rollers 33, 34, 35, 36, 37, 38 and 39. The axis of roller 39 is positioned to coincide with the pivotal axis between body portions 14 and 15. The surfaces of the rollers are configured to transmit their rotation to material in the baling chamber.

Rollers 21–39 have shafts which extend at the right side of the machine to bearings 40. At the left side of the machine the shafts are similarly supported, and carry sprocket wheels 41–59 respectively by which the conveyors may be rotated in the same direction using a mechanical drive which will be described below. Sprocket wheels 41, 47, 48, 49 and 59 are double, the others being single.

Drive shaft 17 is connected to a right-angle drive having an output sprocket wheel 60. A first sprocket chain 61 drives sprocket wheels 47 and 48 from wheel 60, a take-up wheel 62 being provided. A second sprocket chain 63 connects sprocket wheel 47 in driving relation to wheels 46, 45, 44, 43, 42 and 41, a take-up wheel 64 being provided. A third sprocket chain 65 connects sprocket wheel 48 in driving relation to wheels 49 and 50, take-up wheels 66 and 67 being provided. A fourth sprocket chain 70 connects sprocket wheel 41 in driving relation to wheel 59, a take-up wheel 71 being provided. A fifth sprocket chain 72 connects sprocket wheel 59 in driving relation to wheels 51–58, a take-up wheel 73 being provided. Thus drive shaft 17 is enabled to cause rotation of all the sprocket wheels, and hence of all the conveyors, in the same direction, indicated by the arrows in FIG. 3.

Examination of FIG. 3 will make clear that the axes of the conveyors pass through a smooth closed curve, in a vertical plane perpendicular to the axis, that except for the axis of roller 32 all the lower conveyors are disposed generally on the arc of a circle 74, and that the upper conveyors are outwardly displaced from the circle by amounts which increase smoothly to a maximum value for the upper roller 21. A preferred ratio of height to width for baling chamber 20 is 1.2 to 1, but the ratio can vary between 1.1 to 1 and 1.3 to 1 without ill effects.

Near the bottom of the front body portion 14 a roller is omitted, to provide an opening for feeding material into the baling chamber.

A pick-up mechanism 80 is provided, and comprises a rotatable conveyor or inlet roller 81 having a plurality of tines 82 extending from its outer surface along its length and passing between the fingers 83 of a stripper. Tines 82 collect vegetative material to be baled from the ground as the machine is moved across the ground and deliver it to the interior of baling chamber 20. Cylinder 81 carries a sprocket wheel 84, and a sixth sprocket chain 85 drives wheel 84 from wheel 49, conventional means being provided for adjusting the height of cylinder 81 above the ground surface and for maintaining suitable tension in chain 85. In one embodiment of the invention, roller 32 is about four inches above roller 31, and about five inches outside of circle 74.

A conventional twine wrapping device not shown may also be provided. Conventional means including hydraulic cylinders 86, 87 may also be used to pivot or lock rear portion 15 with respect to front portion 14, so as to enable or prevent discharge of the completed and wrapped bale from the machine.

Operation

The operation of the improved baling machine will now be readily apparent, referring to FIGS. 3–5. Hydraulic fluid is supplied to cylinders 86, 87 to hold portion 15 against portion 14, and power is supplied to shaft 17. As the machine is driven on over the ground 90 in the direction of the arrow 91, rotating tines 82 lift from the ground vegetative material 92 lying in a windrow on the ground and impel it across stripper 83 until it is engaged from below by the surface of roller 29. The speed of movement of the machine is preferably such that the material forms a continuous flow 93, across rollers 29, 30, and 31, which is turned slightly upward by roller 32 and is then deflected sharply inwardly by engagement with cylinder 33 below its center by reason of the outward displacement of cylinder 32. This causes the immediate formation of a small incipient bale 94 with almost no void at its center, and rotation of the material in the direction of arrows 95 continues as material continues to be fed thereto. As the supply of material continues a greater and greater volume of the baling chamber is occupied, and a larger and larger number of conveyor cylinders engage the material to cause its rotation to continue. Presently a "kneading" action on the material commences, as will next be described: feeding of material into the chamber is interrupted when the chamber is filled to an extent suggested in FIG. 4, but rotation of the conveyor cylinders and therefore of the body of material in the chamber is continued.

Referring now to FIG. 4, in which the chamber is shown loosely filled to its full height, it will be evident that the pressure exerted on the material by rollers 26-31 and 33-35 is essentially radial. Rollers 22, 23, 24 and 25, on the other hand, exert additional components of pressure on the rotating material which have a rearward direction as suggested by arrows 96, and these forces cause movement of the outer portions of the material peripherally with respect to the inner portions of the material. These peripheral components of motion produce an action which is identified by the term "kneading", since it is not a simple inward compression but causes peripheral movement as well. The result is that the bale begins to assume a more and more completely circular section, settling gradually away from cylinder 21, then from cylinders 22 and 39, then from cylinders 23 and 38, and so on, so that ultimately the compressive forces on the bale are due only to the reaction of its weight on lower rollers. The displacement of roller 32, and the lack of a roller at the input location, do not materially affect the baling action: when the cylindrical shape shown in FIG. 5 is attained, the baling is complete, the bale may be bound with twine in conventional fashion, and may then be discharged from the machine by operation of hydraulic cylinders 86 and 87 to pivot rear portion 15 outwardly with respect to front portion 14.

From the foregoing it will be evident that the invention comprises a baling machine in which conveying rollers are positioned and driven so as to produce a bale having more desirable density and density distribution, by applying a peripheral component of force, or a kneading action, to the material being baled in addition to compressing it radially.

Numerous advantages and and characteristics of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A baling machine for forming rolled bales, comprising:
   (a) a frame;
   (b) means for supporting said frame for movement;
   (c) a body mounted on said frame, said body including a fixed front portion and a movable rear portion;
   (d) a plurality of generally transverse, parallel rollers rotatably mounted on said body, said rollers being arranged to define a vertically elongated baling chamber in cross-section having an arched upper end and a rounded lower end with an inlet;
   (e) means mounted in said inlet of said baling chamber for picking up agricultural material and feeding said material into said chamber;
   (f) means for effecting rotation of said roller such that the agricultural material in said chamber is rolled and kneaded into a generally cylindrical bale; and (g) means for relatively moving the rear portion of said body relative to the front portion for removal of the bale.

2. The baling machine of claim 1 wherein one of said rollers located inward of said feeding means and along the rounded lower end of said baling chamber is displaced outwardly to facilitate formation of an incipient bale.

3. A machine for forming material into cylindrical bales of density increasing from the center to the periphery comprising, in combination:

a mobile structure including first and second body portions pivotally secured together on a generally horizontal transverse axis;

a baling chamber of non-circular, vertically elongated cross-sectional configuration in said structure defined by spaced conveyors in the form of right circular cylinders, means mounting said conveyors with their axes parallel and passing through points lying on a smooth closed curve in a vertical plane perpendicular to said axes, the lower half of said curve being generally a circular arc and the upper half departing outwardly from circularity by an amount which varies smoothly to and from a maximum in the vertical direction;

pickup means operable to gather material to be baled from the ground and introduce it as a ribbon peripherally into said chamber at the bottom thereof;

and power means causing operation of said pickup means and rotation of said conveyors in the same direction about their axes.

4. A machine according to claim 3 in which one of said conveyors at the bottom of said chamber and inward of said pickup means is outwardly displaced from said arc.

5. A machine according to claim 3 in which the height of the baling chamber has a ratio of between 1.1 to 1 and 1.3 to 1 to the width of the chamber.

6. A machine according to claim 3 in which the ratio of the height of the baling chamber to its width is about 1.2 to 1.

7. A machine according to claim 3 in which said pickup means includes one of said conveyors as an inlet cylinder, and in which another of said conveyors near the bottom of said chamber and inward of said inlet cylinder is somewhat displaced upwardly with respect to said inlet cylinder, and outwardly with respect to said circular arc, whereby a small incipient bale is formed upon the feeding of vegetative material into said baling chamber by said pickup means.

8. A baling chamber of non-circular, vertically elongated cross-sectional configuration comprising a plurality of closely spaced conveyors in the form of right circular cylinders, means mounting said conveyors with their axes parallel and passing through points lying on a smooth closed curve in a vertical plane perpendicular to said axes, the lower half of said curve being a generally circular arc and the upper half departing outwardly from circularity by an amount which varies smoothly to and from a maximum in the vertical direction, and power means causing rotation of said conveyors in the same direction about their axes.

9. A chamber according to claim 5 in which the maximum departure from circularity in the vertical direction is substantially $\frac{1}{3}$ of the lateral dimension.

10. A chamber according to claim 5 and means for introducing material to be baled peripherally into said chamber at the bottom thereof as a ribbon.

11. A roll baler, which comprises:
(a) frame;
(b) means for supporting said frame;
(c) a body mounted on said frame, said body including a fixed front portion and a pivotal rear portion, said pivotal rear portion being pivotal with respect to said front portion about a transverse axis;
(d) means attached to said body for defining the periphery of a baling chamber of a fixed configuration, said means being arranged to define a vertically elongated baling chamber in cross-section having an arched top portion and a rounded lower portion with an inlet, said baling chamber being displaced outwardly near the bottom thereof and inward from said inlet to facilitate formation of incipient bales;
(e) means for picking up agricultural material and feeding said material through said inlet into said baling chamber; and
(f) means for effecting rotation of said material in said baling chamber such that said material is rolled and kneaded into a generally cylindrical bale of improved density distribution.

* * * * *

UNITED STATES PATENT AND TRADEMARK OFFICE
CERTIFICATE OF CORRECTION

PATENT NO. : 4,345,421

DATED : August 24, 1982

INVENTOR(S) : Terry R. Schwalenberg et al

It is certified that error appears in the above—identified patent and that said Letters Patent is hereby corrected as shown below:

Claim 1, line 17, delete "roller" and insert therefor --rollers--.

Signed and Sealed this

Eighteenth Day of January 1983

[SEAL]

Attest:

GERALD J. MOSSINGHOFF

Attesting Officer

Commissioner of Patents and Trademarks